Dec. 11, 1962 E. ROESCH 3,067,789
TIRE MOUNTING AND SPINNING DEVICE
Filed May 1, 1961 2 Sheets-Sheet 1

INVENTOR
Ernst Roesch

Webster & Webster
ATTORNEYS

Dec. 11, 1962 E. ROESCH 3,067,789
TIRE MOUNTING AND SPINNING DEVICE
Filed May 1, 1961 2 Sheets-Sheet 2
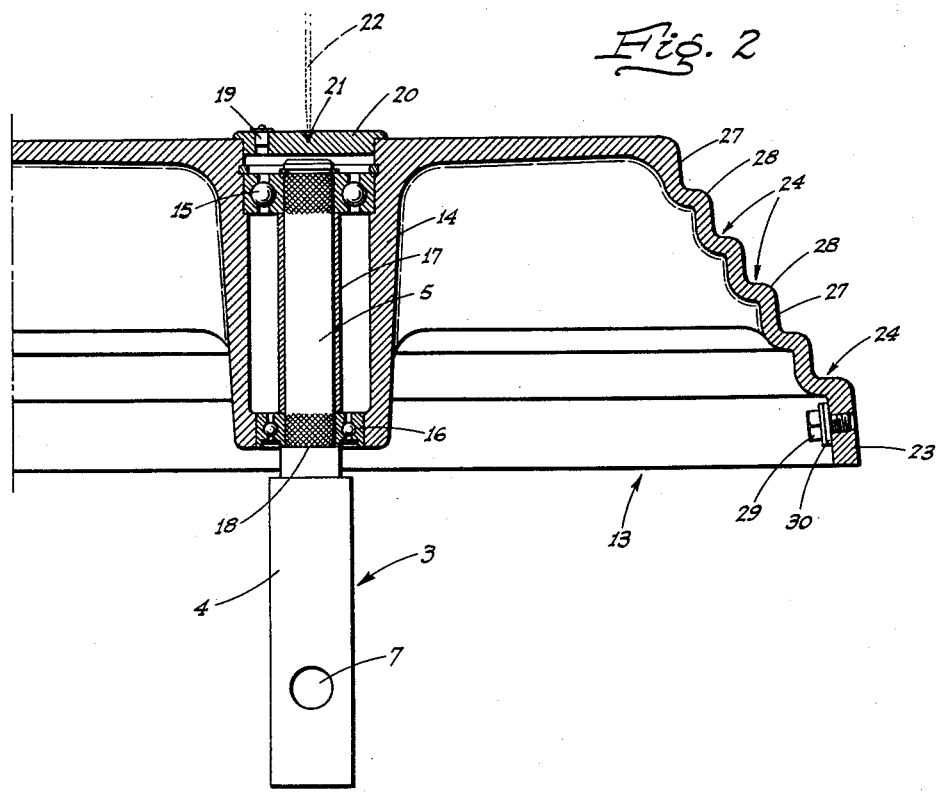
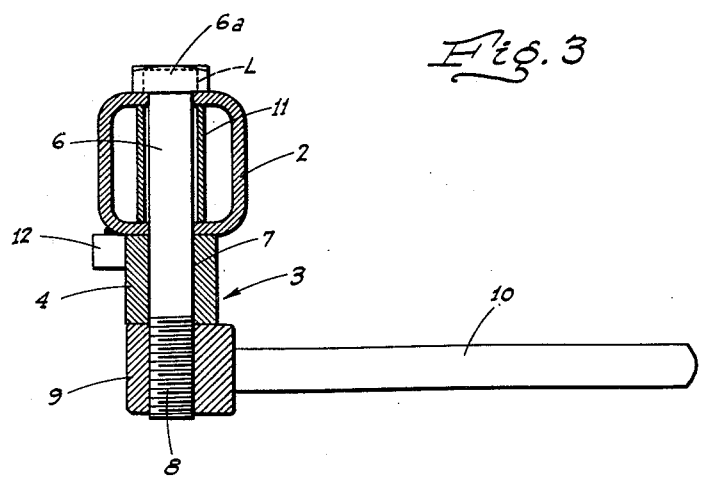

United States Patent Office 3,067,789
Patented Dec. 11, 1962

3,067,789
TIRE MOUNTING AND SPINNING DEVICE
Ernst Roesch, Lodi, Calif., assignor to Super Mold Corporation of California, Lodi, Calif., a corporation of California
Filed May 1, 1961, Ser. No. 106,947
3 Claims. (Cl. 144—288)

This invention relates to tire working equipment and particularly to a piece of equipment of especial value in tire retreading and similar shops.

The major object of the invention is to provide a device in the form of a stand having means thereon to support a tire for free spinning movement with a minimum of friction and without any power means being necessary, and arranged so that the tire may be disposed in any position between horizontal and near-vertical, at the option of the operator.

A further object of the invention is to provide, as a part of the device, a free-spinning drum, the rim of which is formed as a series of seats of different diameters arranged in stepped relation on the rim, and each of a size to engage and fit a bead of a tire of a standard size. In this manner the one drum may be used to mount a number of tires of different standard bead-diameter sizes.

In connection with the bead seats, it is another object of the invention to form each seat so that a single bead of a related tire may be readily engaged with the seat, and will then be automatically and firmly held in a perfectly centered position on the drum for spinning therewith.

The device, with the above generally described features, thus provides a very efficient tire supporting stand so that various operations may be carried out on the tire while the latter is spinning.

Such operations include painting the tire sidewalls, placing striping borders on whitewalls, marking a guide line on a sidewall, so that whitewall stock may be quickly and easily applied thereto, and stitching down such stock after it has been applied. These operations are performed while the drum and tire are horizontally disposed.

When the drum and tire are tilted toward a vertical position, various other operations, such as cement spraying, splice-position locating, and the like can be readily and conveniently undertaken.

It is also an object of the invention to provide a practical, reliable, and durable tire mounting and spinning device, and one which will be exceedingly effective for the purpose for which it is designed.

These objects are accomplished by means of such structure and relative arrangement of parts as will fully appear by a perusal of the following specification and claims.

In the drawings:

FIG. 2 is an enlarged fragmentary sectional elevation of the drum, together with its mounting spindle, detached from the supporting column.

FIG. 3 is an enlarged sectional plan on line 3—3 of FIG. 1.

Figures 1, 4:
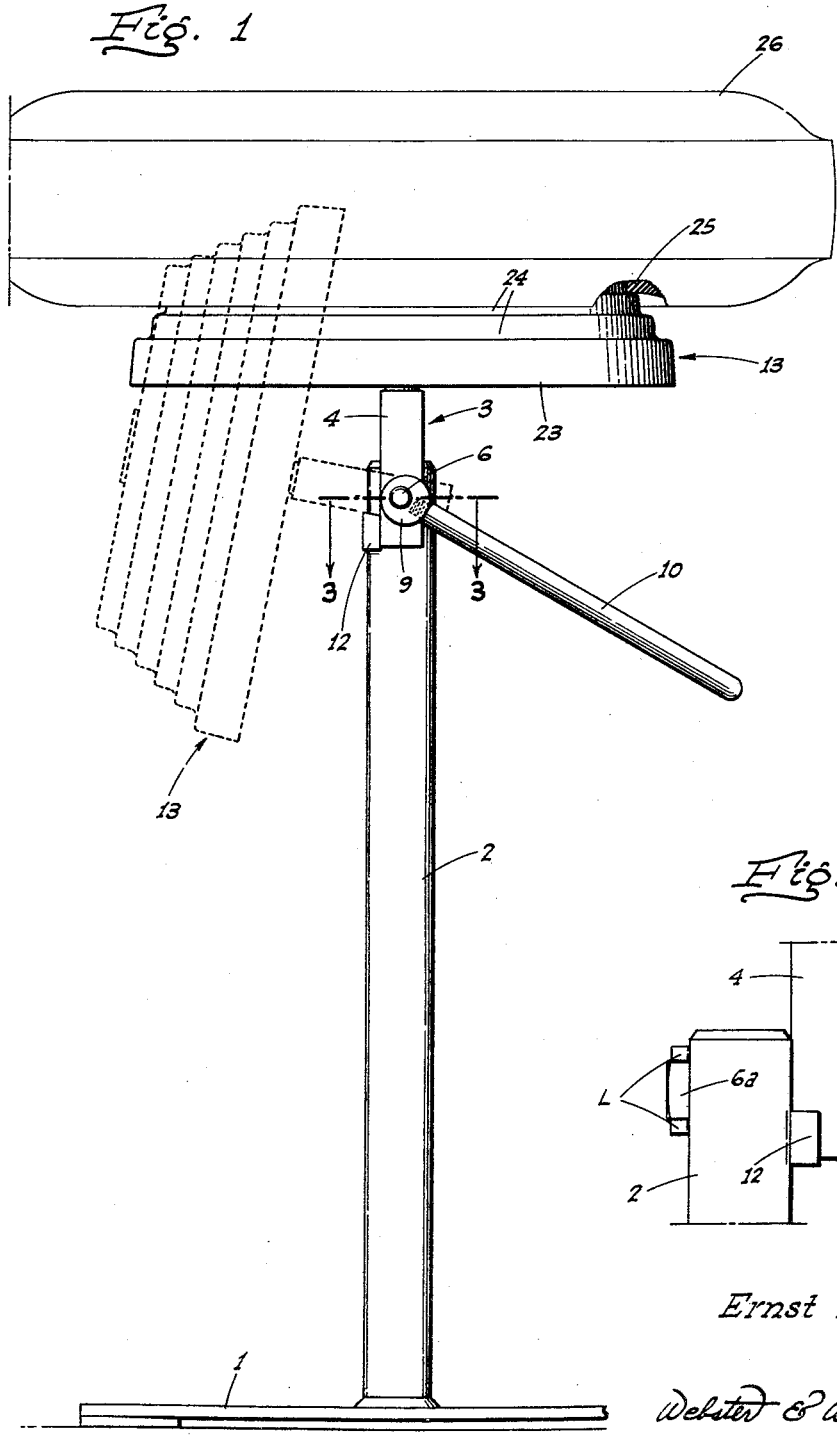
FIG. 1 is a side elevation, partly broken away, of the tire mounting and spinning device as in one position of use; the fully lowered angular position of the tire supporting drum being shown in dotted lines.
FIG. 4 is a fragmentary front elevation of the column and post of the device, together with the connecting means between the two.

Referring now more particularly to the drawings and to the characters of reference marked thereon, the device comprises a base 1 of suitable configuration, rigidly mounted on and upstanding from which is a column 2. This column is generally square in section, except for the corners being rounded, as shown in FIG. 3, and said column is preferably hollow for lightness.

Disposed to one side of the column 2 at the upper end thereof is the drum mounting post, indicated generally at 3. This post comprises a lower square or rectangular portion 4 and an upper circular spindle portion 5.

The lower part of the post portion 4 abuts on one side thereof directly against said one side of the column 2, and a pivot forming bolt 6 projects through the column 2 and through a hole 7 in the abutting portion of the post to a termination some distance beyond the post; the threaded end portion 8 of the bolt being exposed clear of the post. The bolt 6 is held against rotation in the column by means of stop lugs L on the column 2 above and below the head 6a of the bolt, said head engaging the sidewall of the column 2 opposite that engaging the post; the latter being turnable on the bolt.

A clamping nut 9, removably mounted on the end of a radial handle 10, engages the threaded portion of the bolt so that the post may be clamped against the column 2 and held against rotation or turning, or angular adjustment, relative to the column.

In order to prevent such clamping action from tending to collapse the hollow column, the bolt 6 within the column is surrounded by a rigid spacer tube 11 extending between the opposite sides thereof. The post is limited in rotation or adjustment between a vertical position and one approaching the horizontal, as illustrated in FIG. 1, by means of a stop bar 12 secured on one side of the column below the pivot bolt; the upper face of the bar engaging the post when the latter is swung to said limit of movement.

The spindle portion 5 of post 3 supports the tire mounting drum 13 of special construction, as will now be described. Said drum, which is hollowed out from below for lightness, includes a hollow axial hub 14 into which the spindle 5 projects. The spindle within the hub is engaged by vertically spaced ball or other anti-friction bearings 15 and 16, the inner races of which are engaged and held spaced by a spacer tube 17 about the spindle. The inner race of the lower bearing 16 is seated on a shoulder 18 formed on the post at the base of the spindle. A fitting 19 in the cap 20 of the hub enables lubricant to be fed to the bearings. Said cap is formed with a small socket 21 disposed axially of the spindle and drum, and arranged to receive the center pin of a tire marking implement; such center pin being indicated in part and in dotted lines at 22.

The rim 23 of the drum is formed as a plurality of axially spaced seats 24 for a bead 25 of a tire 26. These seats are arranged in step form, as shown, to fit the beads of a number of different standard sizes of tires; the circumferentially extending bottom faces 27 of these seats being disposed at a slight taper relative to the axis of the drum. The diameter of each seat-face 27 at its widest point, which is adjacent the bottom thereof, is slightly less than the bead diameter of a tire which will engage said seat. For example, if the tire-bead diameter is 14", the diameter of the corresponding seat 27 adjacent the bottom thereof is approximately 13.87". At its radially innermost end, each such seat face 27 besides being curved or rounded off as shown at 28, is slightly greater in diameter than the diameter of the tire bead, which is constant laterally of the tire. By reason of this feature of construction, a tire bead may be readily initially engaged on its proper seat, and will then become wedged on the seat, so that the bead—and the tire as a whole—will be firmly supported and will turn with the drum without any tendency to become loosened of itself.

In order to assure the drum having a perfect balance, a cap screw 29 is mounted on the rim 23 internally thereof and adjacent its lower end after it has been determined, by trial, at what point in its circumference the rim and the drum as a whole are the lightest, should such a condition be found to exist. Shims or washers 30 are placed on the cap screw 29 in any number which may be necessary to obtain the desired perfect balance.

From the above description it will be seen that the drum, and a tire supported therein, may be rotated or spun by hand with a minimum of frictional resistance, so that work of various kinds may be done on the upwardly exposed sidewall of the tire while it is spinning. For instance, the sidewall may be painted black, or protective paint applied to a white sidewall, while the paint applying brush is held relatively stationary in one hand of the operator. Since the tire is automatically centered on the drum it rides true for striping a border on a white sidewall.

Also, by the use of a conventional form of marking tool centered in the cap socket 21, a perfect guide line may be marked on the sidewall as the tire spins, so that white rubber stock can be applied faster and more evenly than is the case if the tire is stationary. If an inner tube is disposed in the tire and inflated somewhat, a firm foundation for stitching down the white rubber stock is provided, after such stock has been applied as above noted.

All of the above operations are carried out when the drum and tire are in a horizontal position, with the post 3 in a vertical position.

When the clamping nut 9 is loosened, the drum and tire may be swung or tilted to any suitable angular position, within the limits previously noted, for carrying out other operations on the tire, such as spraying cement on the sidewall thereof, or for balancing the tire. In the latter case, since the drum is perfectly balanced, when it stops rotating the heaviest point of the tire supported thereon will naturally be at the bottom of the drum. A chalk mark may then be made on the tire at the top of the drum to locate the splice for the tread rubber to be subsequently applied; the slight additional weight of the spliced rubber then providing the desired balance for the tire.

The drum is limited in its swinging or tilting movement to an angle short of the perpendicular sufficient to insure a tire being properly supported by one bead without danger of falling off the drum.

It will be noted that the handle 10 is quite long, in order to exert good leverage on the nut, and is of course handier than having to use a separate wrench on the nut. The most convenient position of the handle 10, when the nut 9 is cinched tight, is about 30 degrees below horizontal, and of course in the direction opposite that toward which the drum tilts.

As wear develops in the nut and bolt, the handle 10 must be lowered below the desired position before a full clamping action of the nut is obtained. In this event an adjustment of the bolt will counteract the wear, such adjustment being effected by just loosening the nut, removing the handle therefrom, and further backing off the nut so that the bolt 6 may be retracted to move the bolt head 6a clear of the stop lugs L. The bolt is then rotated in a clockwise direction sufficiently to aline other opposed sides of the bolt head with the stop lugs. The bolt is then advanced so that the head reengages the lugs, and the nut and handle are replaced in their operative positions.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention the following is claimed as new and useful, and upon which Letters Patent are desired:

1. A tire mounting and spinning device comprising a stationary column, a drum provided with a rim having a seat thereon to engage a bead of a tire in frictional supporting relation, means mounting the drum on the column for free spinning rotation relative thereto, said means comprising a post the lower portion of which overlaps and abuts against one side of the column adjacent its upper end, and a spindle on the upper end of the post on which the drum is turnable; a transversely extending pivot bolt non-turnably mounted on the column and on which the column-abutting portion of the post is turnable, means preventing turning of the post in other than one direction from vertical, the bolt having a threaded end portion projecting beyond the post, and means to releasably clamp the post against the column and comprising an enlarged nut on the threaded portion of the bolt engaging the adjacent face of the post, and an elongated handle rigid with and projecting substantially radially of the nut in the direction opposite that toward which the post may turn from vertical; the handle being longer than the distance from the pivot bolt to the bottom of the drum; said handle being removably but rigidly mounted on the nut.

2. A tire mounting and spinning device comprising a stationary column, a drum provided with a rim having a seat thereon to engage a bead of a tire in frictional supporting relation, means mounting the drum on the column for free spinning rotation relative thereto, said means comprising a post the lower portion of which overlaps and abuts against one side of the column adjacent its upper end, and a spindle on the upper end of the post on which the drum is turnable; a transversely extending pivot bolt non-turnably mounted on the column and on which the column-abutting portion of the post is turnable, means to clamp the post against the column in a number of different positions from and to one side of the vertical, and a single stop element fixed on the column, said stop element having post-abutting faces in position to limit the turning movement of the post about the pivot bolt in one direction to a vertical position of the spindle and in the opposite direction to a position at which the spindle approaches but is short of horizontal and stopping the post at the latter position of the spindle.

3. A device, as in claim 1, in which the drum at the top is provided with a relatively small and shallow upwardly facing socket disposed axially of the drum.

References Cited in the file of this patent
UNITED STATES PATENTS

| | | |
|---|---|---|
| 318,702 | Denno | May 26, 1885 |
| 1,949,501 | Thacher | Mar. 6, 1934 |
| 2,201,982 | Bazarek | May 28, 1940 |
| 2,213,535 | Seip | Sept. 3, 1940 |
| 2,366,685 | Chambers | Jan. 2, 1945 |
| 2,679,751 | Pfeiffer | June 1, 1954 |
| 2,973,791 | French | Mar. 7, 1961 |